United States Patent
Saint Clair (10) Patent No.: US 9,739,644 B2
(45) Date of Patent: Aug. 22, 2017

(54) INTERFEROMETRIC ROTARY ENCODER

(71) Applicant: The Boeing Company, Chicago, IL (US)

(72) Inventor: Jonathan M. Saint Clair, Seattle, WA (US)

(73) Assignee: The Boeing Company, Chicago, IL (US)

( * ) Notice: Subject to any disclaimer, the term of this patent is extended or adjusted under 35 U.S.C. 154(b) by 250 days.

(21) Appl. No.: 14/723,929

(22) Filed: May 28, 2015

(65) Prior Publication Data
US 2016/0349086 A1    Dec. 1, 2016

(51) Int. Cl.
*G01D 5/26*    (2006.01)

(52) U.S. Cl.
CPC .................. *G01D 5/266* (2013.01)

(58) Field of Classification Search
CPC .................. G01D 5/38; G01D 5/266
See application file for complete search history.

(56) References Cited

U.S. PATENT DOCUMENTS

| | | |
|---|---|---|
| 7,135,673 B2 | 11/2006 | Saint Clair |
| 7,615,737 B2 | 11/2009 | Saint Clair et al. |
| 7,903,261 B2 | 3/2011 | Saint Clair et al. |

FOREIGN PATENT DOCUMENTS

WO    WO 2013070871    *  5/2013

* cited by examiner

*Primary Examiner* — Tony Ko
(74) *Attorney, Agent, or Firm* — Ostrager Chong Flaherty & Broitman P.C.

(57) ABSTRACT

A precision optical encoder that utilizes interferometric measurements of displacement to provide angle measurements using a laser which is injection locked to a reference laser having a secondary optical frequency which has been verified with respect to a primary optical frequency standard. The encoder shape encodes distance to rotation angle. By utilizing a laser source locked to a reference laser having a standardized (i.e., verified) secondary optical frequency for fundamental measurements of the encoder surface and realtime interferometer measurements, the encoder reports rotation angle measurements that are directly traceable to a primary optical frequency standard through the injected secondary optical frequency.

22 Claims, 5 Drawing Sheets

INTERFEROMETRIC ROTARY ENCODER

BACKGROUND

This disclosure generally relates to optical measuring devices. More particularly, this disclosure relates to apparatus and methods for optically measuring the angular position of a rotating part.

Optical metrology systems measuring dimensions in three degrees of freedom are limited in their accuracy by the high uncertainties in the multi-axis pointing angle measurements of the optical measurement system. Gimbals are multi-axis line-of-sight pointing devices typically used. Such gimbals are composed of rotation stages which have rotary encoders to report the angle the rotation stage occupies. These encoders set the limit for the quality of the overall three-dimensional measurement which the metrology system reports. For large-scale objects, such as airplanes, the impact of angle error dominates the uncertainties, limiting the range of applications of existing capability, and also incurring increased costs to meet quality verification objectives on large complex structures.

Existing solutions use techniques to encode the angles into electrical signals that are intrinsically limited in accuracy, and are not directly traceable to any length, time, or other basic standard. Generally, existing rotary encoders utilize a structure with encoding that presents a pattern to a pattern sensor, which senses changes in the code as a function of angle of the rotating object. A typical encoder is a series of linear regions arrayed along the radii of a circle of fixed diameter. An optical sensor measures the change in intensity when the pattern is illuminated. Lack of traceability to standards causes measurements in different parts of the world to be different. While it is possible to directly calibrate a laser tracker's range performance to a national standard (e.g., frequency), a tracker's three-dimensional performance is limited by the angle measurements, for which there is no directly traceable measurement.

It would be advantageous to provide encoders which report rotation angle measurements that are directly traceable to a standard.

SUMMARY

The subject matter disclosed in detail below is directed to a precision optical encoder that utilizes interferometric measurements of displacement to provide angle measurements using a measurement laser which is injection locked to a reference laser. The reference laser has a secondary optical frequency which has been verified with respect to a primary optical frequency standard. The encoder shape encodes distance to rotation angle. By utilizing a laser source locked to a reference laser having a standardized (i.e., verified) secondary optical frequency for fundamental measurements of the encoder surface and real-time interferometer measurements, the encoder reports rotation angle measurements that are directly traceable to a primary optical frequency standard through the injected secondary optical frequency.

One aspect of the subject matter disclosed in detail below is an interferometric rotary encoder comprising: a rotatable component comprising means for reflecting light disposed on one end; a stator having a reference plane separated by an air gap from the light reflecting means; a light source; a first interferometer having a first absolute reference length; a second interferometer having a second absolute reference length greater than the first reference length; an optical network comprising first and second optical waveguides which direct respective portions of light transmitted by the light source into the first and second interferometers respectively, and third and fourth optical waveguides which direct respective portions of light transmitted by the light source toward the light reflecting means; first and second photodetectors optically coupled to the first and second optical waveguides for receiving light from the first and second interferometers respectively; third and fourth photodetectors optically coupled to the third and fourth optical waveguides for receiving light from the light reflecting means; and a processor and a processor configured to compute a rotation angle of the rotor based at least in part on phase shift information contained in electrical signals from the first through fourth photodetectors produced in response to activation of the light source. In the disclosed embodiments, the light source comprises a reference laser and an injection-locked laser which is injection locked to the reference laser, wherein the reference laser has an optical frequency which conforms to an optical frequency standard. The interferometric rotary encoder may further comprise: amplification circuitry that amplifies electrical signals output from the first through fourth photodetectors; and an analog-to-digital converter for converting amplified electrical signals into digital electrical signals which are received by the processor. The rotatable component may comprise a rotor and an encoder wedge attached to the rotor.

In accordance with one implementation, the optical network further comprises: a first fiber optic splitter connected to the light source; a second fiber optic splitter connected to the first fiber optic splitter; a third fiber optic splitter connected to the second fiber optic splitter; a first optical circulator connected to the first fiber optic splitter, to the first optical waveguide, and to the first photodetector; a second optical circulator connected to the second fiber optic splitter, to the second optical waveguide, and to the second photodetector; and a third optical circulator connected to the third fiber optic splitter, to the third optical waveguide, and to the third photodetector.

In accordance with some embodiments, the light reflecting means comprise an angled surface of the rotatable component which is polished optically flat or diffusely scattering. In accordance with other embodiments, the light reflecting means are disposed on an angled surface of the rotatable component. In all of these cases, the angled surface is not perpendicular to an axis of rotation of the rotatable component.

Another aspect of the disclosed subject matter is a method for encoding rotation angles of a rotor, comprising: attaching a multiplicity of reflective elements to an endface of a rotatable component; optically coupling a first interferometer to a light source, the first interferometer having a first absolute reference length equal to a first distance from a first point on a stator to a first point on the endface of the rotatable component; optically coupling a second interferometer to the light source, the second interferometer having a second absolute reference length equal to a second distance from a second point on the stator to a second point on the endface of the rotatable component, the second distance being greater than the first distance; optically coupling respective distal ends of first and second optical waveguides to the light source, the distal ends of the first and second optical waveguides being respectively positioned at third and fourth points on the stator and oriented to respectively direct exiting light toward third and fourth points on the endface of the rotatable component; activating the light source to transmit light from the light source to the first and second interferometers and to the first and second optical waveguides; following activation of the light source, converting light returned by the first and second interferometers and light returned to the distal ends of the first and second optical waveguides from the reflective elements into first through fourth electrical signals respectively; and computing a rotation angle of the rotor based at least in part on phase shift information contained in the first through fourth electrical signals. This method may further comprise injection locking a laser to a reference laser to form the light source. The reference laser has an optical frequency which conforms to an optical frequency standard.

A further aspect of the subject matter disclosed in detail below is an interferometric rotary encoder comprising: a rotatable component having an axis of rotation and comprising an endface which is inclined relative to a plane perpendicular to the axis of rotation; a multiplicity of reflective elements disposed on the endface of the rotatable component; a stator having a reference plane separated by an air gap from the reflective elements and disposed generally perpendicular to the axis of rotation; a light source; a first first interferometer having a first absolute reference length equal to a first distance from a first point on the stator to a first point on the endface of the rotatable component; a second interferometer having a second absolute reference length equal to a second distance from a second point on the stator to a second point on the endface of the rotatable component, the second distance being greater than the first distance; optical coupling means configured such that the first and second interferometers and first and second reflective elements of the multiplicity of reflective elements are optically coupled to the light source, first through fourth photodetectors; first through fourth optical waveguides for connecting the first through fourth photodetectors respectively to the optical coupling means, wherein the optical coupling means are further configured such that the first and second photodetectors receive light returned by the first and second interferometers respectively, and the third and fourth photodetectors receive light returned from the first and second reflective elements; and a processor configured to compute a rotation angle of the rotatable component based at least in part on phase shift information contained in electrical signals from the first through fourth photodetectors produced in response to activation of the light source. Preferably the light source comprises: a reference laser having an optical frequency which conforms to an optical frequency standard; and an injection-locked laser which is injection locked to the reference laser. The optical coupling means may comprise a multiplicity of optical circulators, a multiplicity of fiber optic splitters, and a multiplicity of optical waveguides connecting the optical circulators and the fiber optic splitters.

Other aspects of interferometric rotary encoders and methods for optically measuring rotation angles of rotating objects are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative embodiments of an interferometric rotary encoder are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
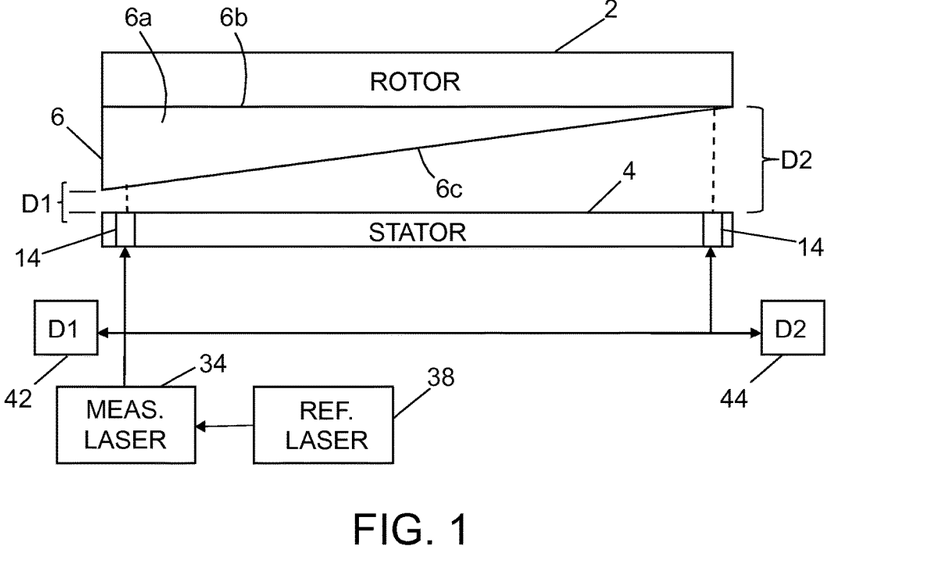
FIG. 1 is a hybrid diagram representing some components of an interferometric rotary encoder in accordance with one embodiment.

FIG. 1 is a hybrid diagram representing some components of an interferometric rotary encoder in accordance with some embodiments. This hybrid diagram includes a diagram representing a side view of an encoder wedge 6 attached to one end of a rotor 2 (only partly shown). The encoder wedge 6 is attached to the rotor 2 such that when the rotor 2 is actuated by a motor (not shown), the rotor 2 and encoder wedge 6 will rotate together about a common axis of rotation. The stator 4 (shown in section in FIG. 1) has a plurality of measurement channels 14, only two of which are indicated in FIG. 1. It should be noted, however, that this depiction is for illustrative purposes only. The measurement channels 14 may be arranged in many different configurations. In particular, it is not necessary that two measurement channels be arranged along a diametral line, which is what the sectional view in FIG. 1 shows if one presumes that the section has been taken along a plane that intersects the center point of stator 4 . . . .

Although not visible in FIG. 1, the rotor 2 (only the end of which is shown) may be a circular cylinder having an end face (disposed perpendicular to an axis of the rotor) with the encoder wedge 6 attached thereto. The encoder wedge 6 may have a circular cylindrical peripheral surface 6a, a planar surface 6b attached to the end face of rotor 2, and an angled planar surface 6c disposed at an acute angle relative to a plane which is perpendicular to the axis of rotation of the rotor. The angled planar surface 6c may have different attributes (diffuse or specular reflectivity) in different embodiments. FIG. 1 depicts the situation wherein the angled planar surface 6c is diffusely reflecting and light is emitted from the measurement channels 14 along paths (indicated by the vertical dashed lines in FIG. 1) which are parallel to the rotor axis of rotation.

The stator 4 (which does not rotate) may take the form of a circular disk having a center point located on the axis of rotation. The stator 4 has a planar surface that faces the angled planar surface 6c of the encoder wedge 6 with an air gap therebetween. That planar surface is preferably disposed perpendicular to the axis of rotation of the rotor. The stator 4 comprises a plurality of measurement channels 14 (only two of which are visible in FIG. 1). The measurement channels 14 may take the form of respective single-mode optical fibers having flat polished fiber ends seated inside apertures formed in the stator 4. These optical fibers act as waveguides. Light propagating through these optical fibers and towards the polished fiber ends will be emitted from the stator apertures. The optical fibers may be oriented such that they direct emitted light toward the angled surface 6c of encoder wedge 6.

As indicated in FIG. 1, the reference plane of the stator may be separated from the angled surface 6c of the encoder wedge 6 by distances which vary in a range bounded by a minimum distance D1 and a maximum distance D2. The shape of the encoder wedge 6 encodes distance to rotation angle, i.e., the distances between measurement channel apertures on the stator 4 and the angled surface 6c of the encoder wedge 6. These distances are determined utilizing interferometric measurements of displacement.

FIG. 1 further includes a block diagram identifying a reference laser 38 and a measurement laser 34, which is injection-locked to the reference laser 38. The reference laser 38 has an optical frequency that has been verified, by an institution that maintains such standards (e.g., the National Institute of Standards and Technology) as being within a predetermined tolerance of a primary optical frequency standard. The measurement laser 34 is a narrow-line-width laser injection locked from the reference laser 38 that is stabilized to the secondary optical frequency standard, i.e., the frequency of the measurement laser 34 is locked to that secondary optical frequency standard.

As shown in FIG. 1, the coherent light from measurement laser 34 is distributed to respective optical fibers which feed the light to the measurement channels 14 of the stator 4 and also to a pair of absolute reference length interferometers 42 and 44, which are temperature stabilized. Interferometer 42 has a length equal to D1, while interferometer 44 has a length equal to D2. The laser light received by the measurement channels 14 is directed toward the angled surface 6c of the encoder wedge 6. Thereafter the measurement channels 14 will receive any laser light reflected by the angled surface 6c back into the measurement channels 14. The respective distances separating each measurement channel aperture from the corresponding spots on the angled surface 6c of the encoder wedge 6 where the emitted laser light impinges can be determined by detecting the resulting phase shifts of the light returned to the measurement channels and then comparing those phase shifts to the reference phase shifts that occur in the interferometers 42 and 44 of known length.

FIG. 1 does not show the system components for processing the optical signals returned to the measurement channels 14 from the encoder wedge 6 in order to measure the angular position of the rotor. As will be explained in detail later with reference to FIG. 7, the signal processing circuitry comprises photodiodes (not shown in FIG. 1) for converting light converting light from interferometers 42, 44 and measurement channels 14 into analog electrical signals, analog-to-digital converters (not shown in FIG. 1) for converting the analog signals to digital signals, and a digital signal processor (not shown in FIG. 1, but see processor 30 in FIG. 7) for processing the digital signals to determine the angular position of the rotor. The digital signal processor 30 utilizes the interferometric measurements of displacement to provide angle measurements during rotation of rotor 2. Because the reference laser 38 is locked to a secondary optical frequency standard, the digital signal processor 30 reports rotation angle measurements that are directly traceable to a primary standard through the embedded secondary standard.

In accordance with an alternative embodiment, the angled surface 6c of the encoder wedge 6 may be polished optically flat. (An optical flat is an optical-grade piece of glass lapped and polished to be extremely flat on one or both sides.) In this case the measurement channels 14 in the stator 4 should be tilted such that the laser beams are incident on the polished surface of the encoder wedge 6 at a 90-degree angle (not shown in FIG. 1, but see FIG. 5); otherwise the impinging light would be reflected away from, not back to the measurement channel in the stator. The tilted channels mitigate Abbe offsets.

Figure 2:
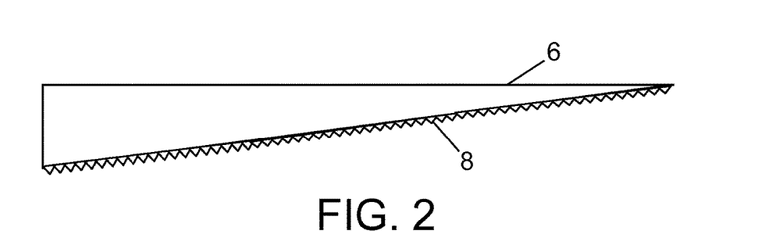
FIG. 2 is a diagram representing a side view of an encoder wedge having an angled retroreflective surface.

In accordance with another embodiment, the angled surface of the encoder wedge 6 may be loaded with an array of very small-scale glass or plastic retroreflectors. FIG. 2 shows a side view of an encoder wedge 6 having an angled surface with retroreflectors 8 embedded therein. This retroreflective surface is designed to direct impinging light from any measurement channel aperture back to that measurement channel aperture. The retroreflectors 8 may take the form of either spherical lenses (e.g., very small glass beads) or prismatic (cube corner) elements embedded in the surface.

Figure 3:
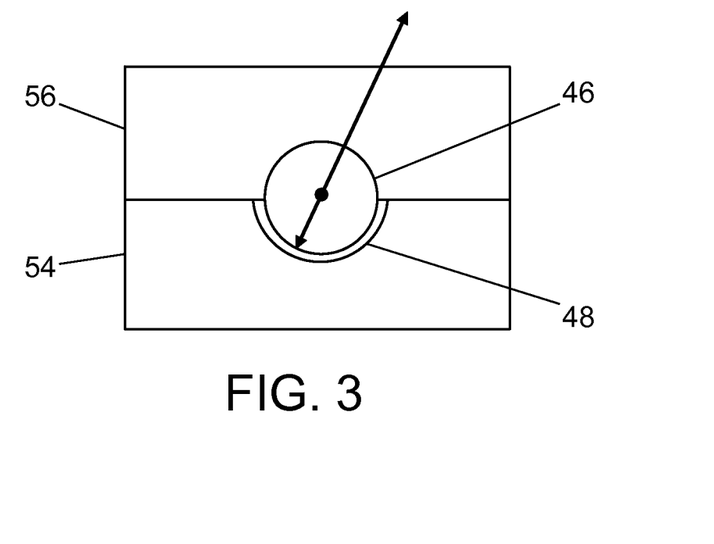
FIG. 3 is a diagram representing a sectional view of a portion of a retroreflective surface having a spherical lens embedded therein.

FIG. 3 shows a sectional view of a portion of a retroreflective surface having a spherical lens 46 seated in a hemispherical reflector 48. The retroreflector depicted in FIG. 3 is partially embedded in a substrate 54 and then covered by an optically transparent protective coating 56. As indicated by the double-headed arrow in FIG. 3, a light ray that passes through the center of the spherical lens 46 will be reflected by the hemispherical reflector 48 back to the source.

Figure 4:
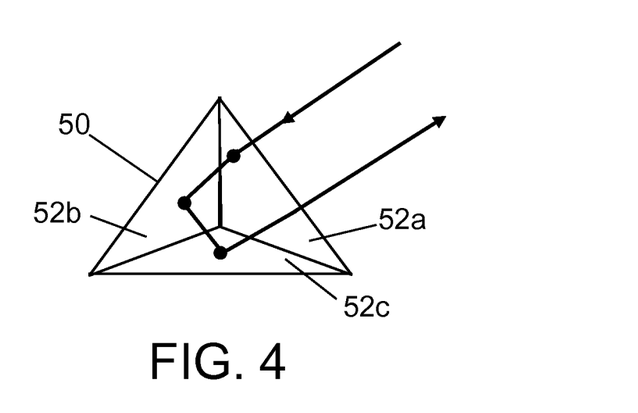
FIG. 4 is a diagram representing a side view of a prismatic (cube corner) element suitable for use as a retroreflector.

FIG. 4 is a diagram representing a side view of a prismatic (cube corner) element 50 suitable for use as a retroreflector in the reflective surface 8. As indicated by arrows in FIG. 4, a ray of light impinging on one facet 52a of the prismatic element 50 will be reflected by that facet toward a second facet 52b, which in turn reflects the ray toward a third facet 52c, which third facet 52c reflects the ray back toward the source along a line parallel to the path of the incoming ray.

Figure 5:
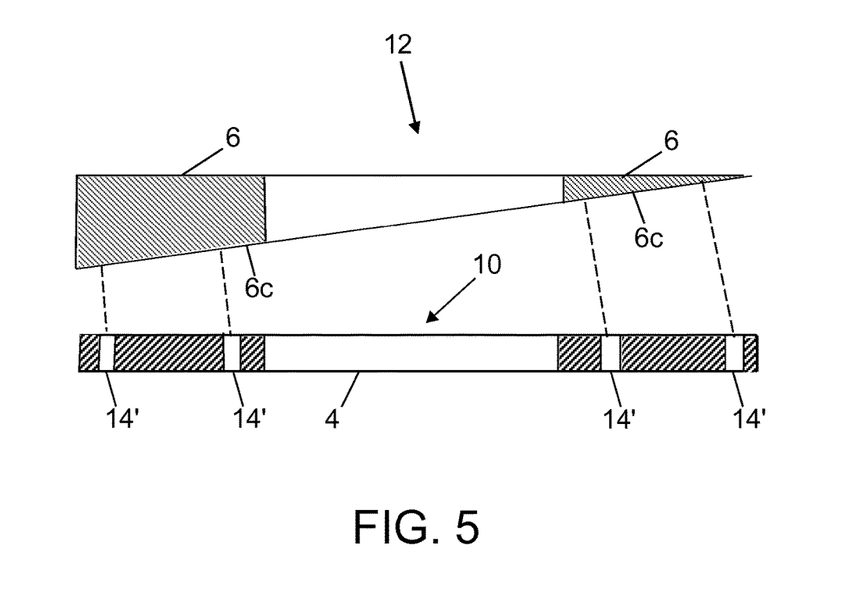
FIG. 5 is a diagram representing a side view of an encoder wedge having a hole and a stator having a hole and a plurality of measurement channels directed at an encoder wedge having a polished optically flat angled surface.

Another encoder wedge design is shown in FIG. 5, which is a side view of an encoder wedge 6 having a hole 12 and a stator 4 having a hole 10 and a plurality of measurement channels 14' directed at a polished optically flat angled surface 6c of the encoder wedge 6. In this embodiment, the measurement channels 14' may be tilted so that the emitted laser light (indicated by dashed lines) is incident on the encoder wedge 6 at an angle normal to the angled surface 6c. In this example, the encoder wedge 6 has a hole 12 in the center, to be compatible with those rotary stages that have a hole in the center.

Figure 6:
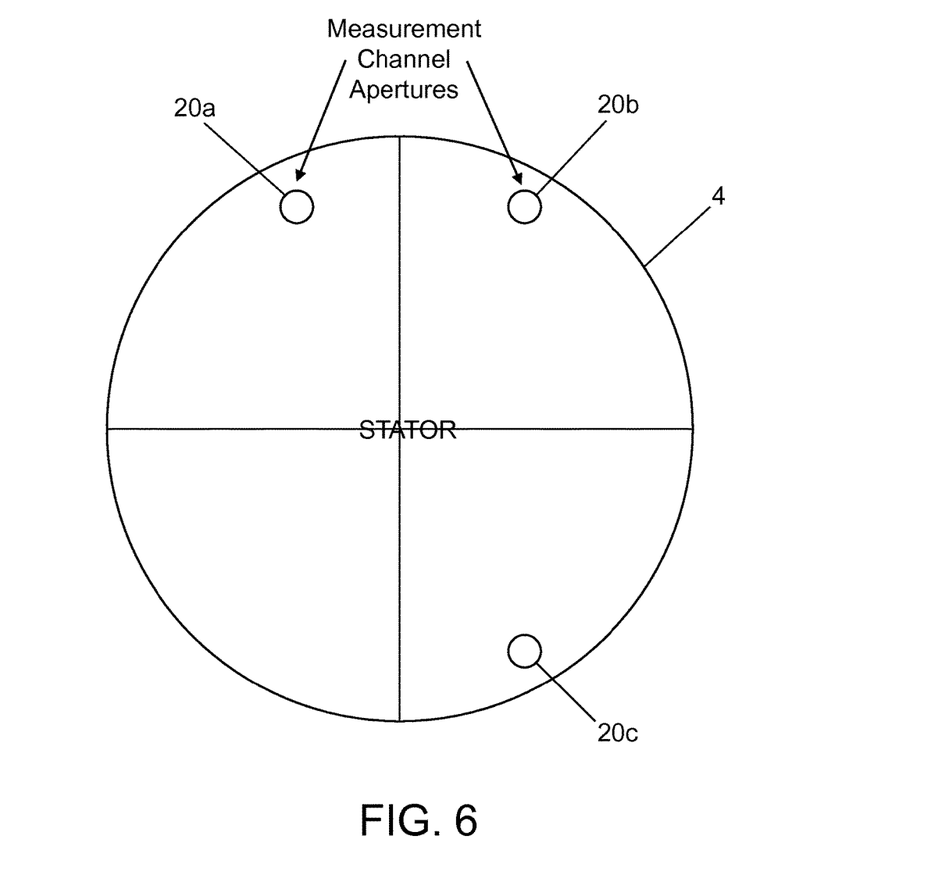
FIG. 6 is a diagram showing a plan view of a stator having a plurality of measurement channel apertures.

FIG. 6 is a diagram showing a plan view of a stator 4 having three measurement channel apertures 20a-20c. This configuration is presented solely for the purpose of illustration. The number of measurement channels can be different than three. In the example depicted in FIG. 6, the measurement channel apertures 20a-20c are located at respective angular positions equidistant from a center point of the surface of the circular stator. (The center point corresponds to the intersection of the orthogonal diametral diametral lines seen in FIG. 6.). The measurement channel apertures 20a-20c emit sensor laser beams and receive reflected laser light from the angled surface 6c of the encoder wedge 6, as previously described. The measurement channels corresponding to apertures 20a-20c direct the light to respective photodetectors and an interferometric process (described below with reference to FIG. 7) that measures the distance from the stator reference plane to the wedge surface for each measurement channel. As the assembly rotates, the distances change proportional to the rotation angle for each measurement channel in accordance with respective mathematical functions that take into account the geometry of the encoder wedge 6 and the respective positions of the respective measurement channel apertures 20a-20c on the face of the stator 4. In accordance with one implementation, the measurement channel apertures 20a-20c may be configured with polarizing-beamsplitter/retroreflector assemblies when the encoder wedge has a retroreflective surface, to minimize signal loss due to polarization effects. The rotary encoder may incorporate as many measurement channels as necessary to measure rotation and tilt simultaneously, and remove ambiguities in direction of motion and absolute rotation position.

Figure 7:
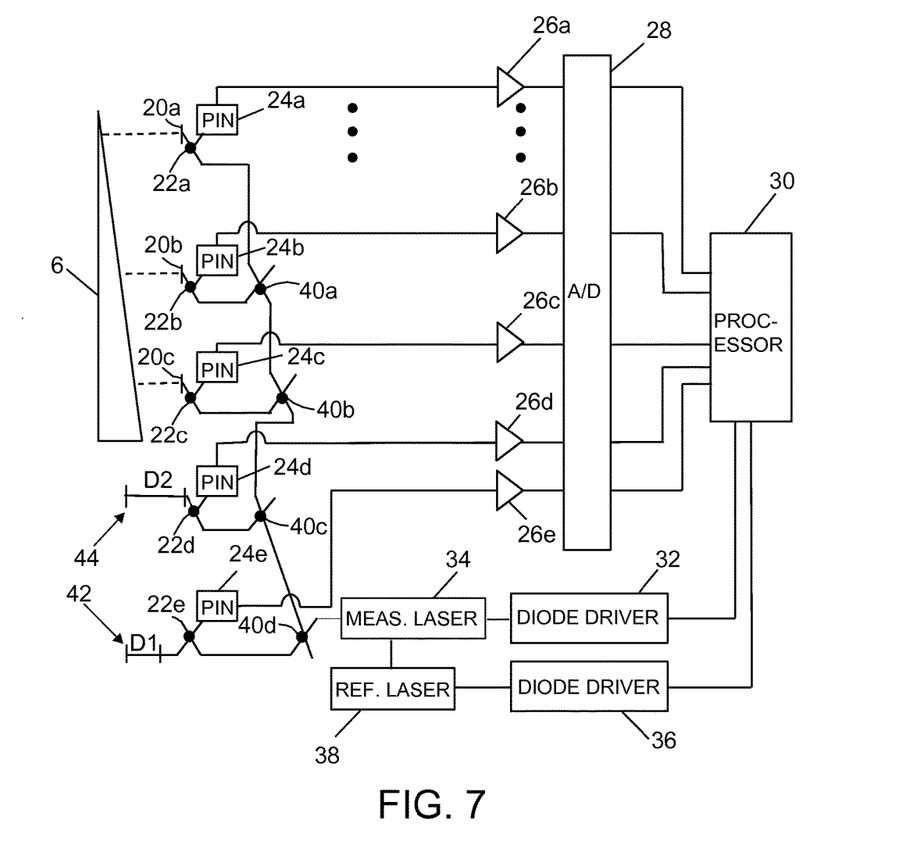
FIG. 7 is a diagram representing some components of an interferometric rotary encoder in accordance with one embodiment. The rotor and stator are not shown.

FIG. 7 is a diagram representing some components of an interferometric rotary encoder in accordance with one embodiment. The rotor is not shown. The only portions of the stator which are shown are the measurement channel apertures 20a-20c. As previously disclosed, the system comprises a reference laser 38 and a measurement laser 34, which is injection-locked to the reference laser 38. The reference laser 38 is driven by a diode driver 36; the measurement laser 34 is driven by a diode driver 32. The diode drivers are controlled by a processor 30. The light from the measurement laser 34 is distributed to the interferometers 42, 44 and to the measurement channel apertures 20a-20c by means of single-mode optical fibers, fiber optic splitters and optical circulators. More specifically, light from the measurement laser 34 is distributed as follows: (a) to interferometer 42 via fiber optic splitter 40d and optical circulator 22e; (b) to interferometer 44 via fiber optic splitters 40d and 40c and optical circulator 22d; (c) to measurement channel aperture 20c via fiber optic splitters 40d, 40c and 40b and optical circulator 22c; (d) to measurement channel aperture 20b via fiber optic splitters 40d, 40c, 40b and 40a and optical circulator 22b; and (e) to measurement channel aperture 20a via fiber optic splitters 40d, 40c, 40b and 40a and optical circulator 22a.

The system depicted in FIG. 7 further comprises a plurality of photodetectors 24a-e (e.g., PIN diodes) which convert light into analog electrical signals. The photodetector 24e receives light from interferometer 42 via optical circulator 22e. The photodetector 24d receives light from interferometer 44 via optical circulator 22d. The photodetector 24c receives light from measurement channel aperture 20c via optical circulator 22c. The photodetector 24b receives light from measurement channel aperture 20b via optical circulator 22b. The photodetector 24a receives light from measurement channel aperture 20a via optical circulator 22a. The analog electrical signals output by photodetectors 24a-e are amplified by respective amplifiers 26a-e and then input into respective analog-to-digital converters of an analog-to-digital converter chip 28. The digital electrical signals are received on respective ports of the processor 30, which is configured or programmed in hardware, software or firmware to convert the digital signals into a rotation angle measurement representing the rotation angle of a rotor (not shown). More specifically, the processor 30 determines the distances traveled by the respective laser beams emitted from the measurement channel apertures by determining the phase shifts relative to the reference phase provided by interferometers 42, 44. Each set of distances encodes the rotation angle of the rotor.

In the example depicted in FIG. 7, the apertures of only three measurement channels are indicated. As previously stated, more than three measurement channels may be provided. An additional optical circulator, an additional photodetector and an additional amplifier would be incorporated in the system for each additional measurement channels. The potential addition of such additional components is indicated by two sets of three bullets near the top of FIG. 7.

The systems disclosed above have the capability to provide the same standards-traceable data anywhere on an object wherever in the world it is measured. The interferometric rotary encoders disclosed herein are especially suitable for use in a multi-axis gimbal.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the term "optical waveguide" means a structure capable of guiding optical waves. An example of an optical waveguide is an optical fiber. The disclosed structures corresponding to the "means for reflecting light" recited in the claims include the diffusely reflecting surface shown in FIG. 1, the retroreflective surface shown in FIG. 2, the polished optically flat surface shown in FIG. 5, and equivalents thereof. The disclosed structures corresponding to the "optical coupling means" recited in the claims include optical circulators, fiber optic splitters, optical waveguides, and equivalents thereof. The disclosed structures corresponding to the "means for determining an angular position of a rotatable component by interferometric measurements using at least light returned from the rotatable component" includes at least interferometers 42 and 44, photodetectors 24a-24e, and processor 30.

The invention claimed is:

1. An interferometric rotary encoder comprising:
a rotatable component having an axis of rotation and comprising an endface which is inclined relative to a plane perpendicular to said axis of rotation;
a measurement laser that produces light which impinges on the endface of the rotatable component; and
means for determining an angular position of said rotatable component by interferometric measurements using at least light returned from the rotatable component.

2. An interferometric rotary encoder comprising:
a rotatable component;
a measurement laser that produces light which impinges on the rotatable component; and
means for determining an angular position of said rotatable component by interferometric measurements using at least light returned from the rotatable component,
wherein the measurement laser is injection locked to a reference laser having a verified optical frequency.

3. An interferometric rotary encoder comprising:
a rotatable component comprising means for reflecting light disposed on one end;
a stator having a reference plane separated by an air gap from said light reflecting means;
a light source;
a first interferometer having a first absolute reference length;
a second interferometer having a second absolute reference length greater than said first reference length;
an optical network comprising first and second optical waveguides which direct respective portions of light transmitted by said light source into said first and second interferometers respectively, and third and fourth optical waveguides which direct respective portions of light transmitted by said light source toward said light reflecting means;
first and second photodetectors optically coupled to said first and second optical waveguides for receiving light from said first and second interferometers respectively;
third and fourth photodetectors optically coupled to said third and fourth optical waveguides for receiving light from said light reflecting means; and
a processor configured to compute a rotation angle of said rotatable component based at least in part on phase shift information contained in electrical signals from said first through fourth photodetectors produced in response to activation of said light source.

4. The interferometric rotary encoder as recited in claim 3, wherein said light source comprises a reference laser and an injection-locked laser which is injection locked to said reference laser.

5. The interferometric rotary encoder as recited in claim 4, wherein said reference laser has an optical frequency which conforms to an optical frequency standard.

6. The interferometric rotary encoder as recited in claim 3, wherein said optical network further comprises:
a first fiber optic splitter connected to said light source;
a second fiber optic splitter connected to said first fiber optic splitter;
a third fiber optic splitter connected to said second fiber optic splitter;
a first optical circulator connected to said first fiber optic splitter, to said first optical waveguide, and to said first photodetector;
a second optical circulator connected to said second fiber optic splitter, to said second optical waveguide, and to said second photodetector; and
a third optical circulator connected to said third fiber optic splitter, to said third optical waveguide, and to said third photodetector.

7. The interferometric rotary encoder as recited in claim 3, wherein said light reflecting means comprise an angled surface of said rotatable component which is polished optically flat, said angled surface being not perpendicular to an axis of rotation of said rotatable component.

8. The interferometric rotary encoder as recited in claim 3, wherein said light reflecting means are disposed on an angled surface of said rotatable component, said angled surface being not perpendicular to an axis of rotation of said rotatable component.

9. The interferometric rotary encoder as recited in claim 8, wherein said light reflecting means comprise a multiplicity of retro-reflectors.

10. The interferometric rotary encoder as recited in claim 8, wherein said light reflecting means comprise a diffusely reflecting surface or a polished optically flat surface.

11. The interferometric rotary encoder as recited in claim 8, wherein said third and fourth optical waveguides have distal ends configured so that light exiting said third and fourth optical waveguides propagates at angles which are normal to said angled surface of said rotatable component.

12. The interferometric rotary encoder as recited in claim 3, wherein said third and fourth optical waveguides are respective optical fibers having polished ends.

13. The interferometric rotary encoder as recited in claim 7, wherein said first absolute reference length is equal to a distance from a point on said stator to a point on said angled surface of said rotatable component.

14. The interferometric rotary encoder as recited in claim 3, further comprising:
amplification circuitry that amplifies electrical signals output from said first through fourth photodetectors; and
an analog-to-digital converter for converting amplified electrical signals into digital electrical signals which are received by said processor.

15. The interferometric rotary encoder as recited in claim 3, wherein said rotatable component comprises a rotor and an encoder wedge attached to said rotor, said light reflecting means being disposed on said encoder wedge.

16. A method for encoding rotation angles of a rotor, comprising:
attaching a multiplicity of reflective elements to an endface of a rotatable component;
optically coupling a first interferometer to a light source, the first interferometer having a first absolute reference length equal to a first distance from a first point on a stator to a first point on the endface of the rotatable component;
optically coupling a second interferometer to the light source, the second interferometer having a second absolute reference length equal to a second distance from a second point on the stator to a second point on the endface of the rotatable component, said second distance being greater than said first distance;
optically coupling respective distal ends of first and second optical waveguides to the light source, the distal ends of the first and second optical waveguides being respectively positioned at third and fourth points on the stator and oriented to respectively direct exiting light toward third and fourth points on the endface of the rotatable component;
activating the light source to transmit light from the light source to the first and second interferometers and to the first and second optical waveguides;
following activation of the light source, converting light returned by the first and second interferometers and light returned to the distal ends of the first and second optical waveguides from the reflective elements into first through fourth electrical signals respectively; and
computing a rotation angle of the rotor based at least in part on phase shift information contained in said first through fourth electrical signals.

17. The method as recited in claim 16, further comprising injection locking a laser to a reference laser to form the light source.

18. The method as recited in claim 17, wherein the reference laser has an optical frequency which conforms to an optical frequency standard.

19. The method as recited in claim 16, wherein the distal ends of the first and second optical waveguides are configured so that light exiting the first and second optical waveguides is incident on the endface of the rotatable component at angles normal to the endface.

20. An interferometric rotary encoder comprising:
a rotatable component having an axis of rotation and comprising an endface which is inclined relative to a plane perpendicular to said axis of rotation;
a multiplicity of reflective elements disposed on said endface of said rotatable component;
a stator having a reference plane separated by an air gap from said reflective elements and disposed generally perpendicular to said axis of rotation;
a light source;
a first interferometer having a first absolute reference length equal to a first distance from a first point on said stator to a first point on said endface of said rotatable component;
a second interferometer having a second absolute reference length equal to a second distance from a second point on said stator to a second point on said endface of said rotatable component, said second distance being greater than said first distance;
optical coupling means configured such that said first and second interferometers and first and second reflective elements of said multiplicity of reflective elements are optically coupled to said light source;
first through fourth photodetectors;
first through fourth optical waveguides for connecting said first through fourth photodetectors respectively to said optical coupling means, wherein said optical coupling means are further configured such that said first and second photodetectors receive light returned by said first and second interferometers respectively, and said third and fourth photodetectors receive light returned from said first and second reflective elements; and
a processor configured to compute a rotation angle of said rotatable component based at least in part on phase shift information contained in electrical signals from said first through fourth photodetectors produced in response to activation of said light source.

21. The interferometric rotary encoder as recited in claim 20, wherein said light source comprises:
a reference laser having an optical frequency which conforms to an optical frequency standard; and
an injection-locked laser which is injection locked to said reference laser.

22. The interferometric rotary encoder as recited in claim 20, wherein said optical coupling means comprise a multiplicity of optical circulators, a multiplicity of fiber optic splitters, and a multiplicity of optical waveguides connected said optical circulators and said fiber optic splitters.

* * * * *